Figure 1:
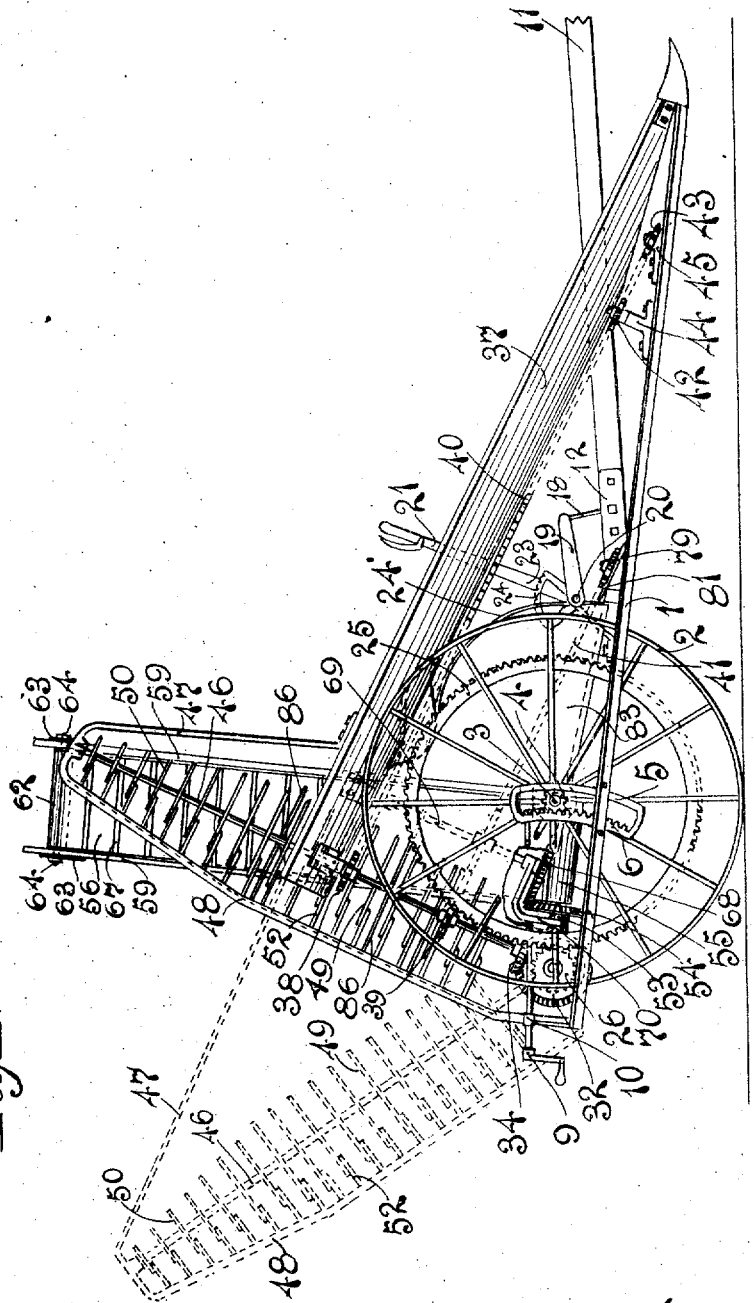

A. G. & A. RONNING.
ENSILAGE HARVESTER.
APPLICATION FILED FEB. 25, 1914.

1,257,403.

Patented Feb. 26, 1918.
3 SHEETS—SHEET 1.

Witnesses

Inventors.
Andrew G. Ronning
Adolph Ronning

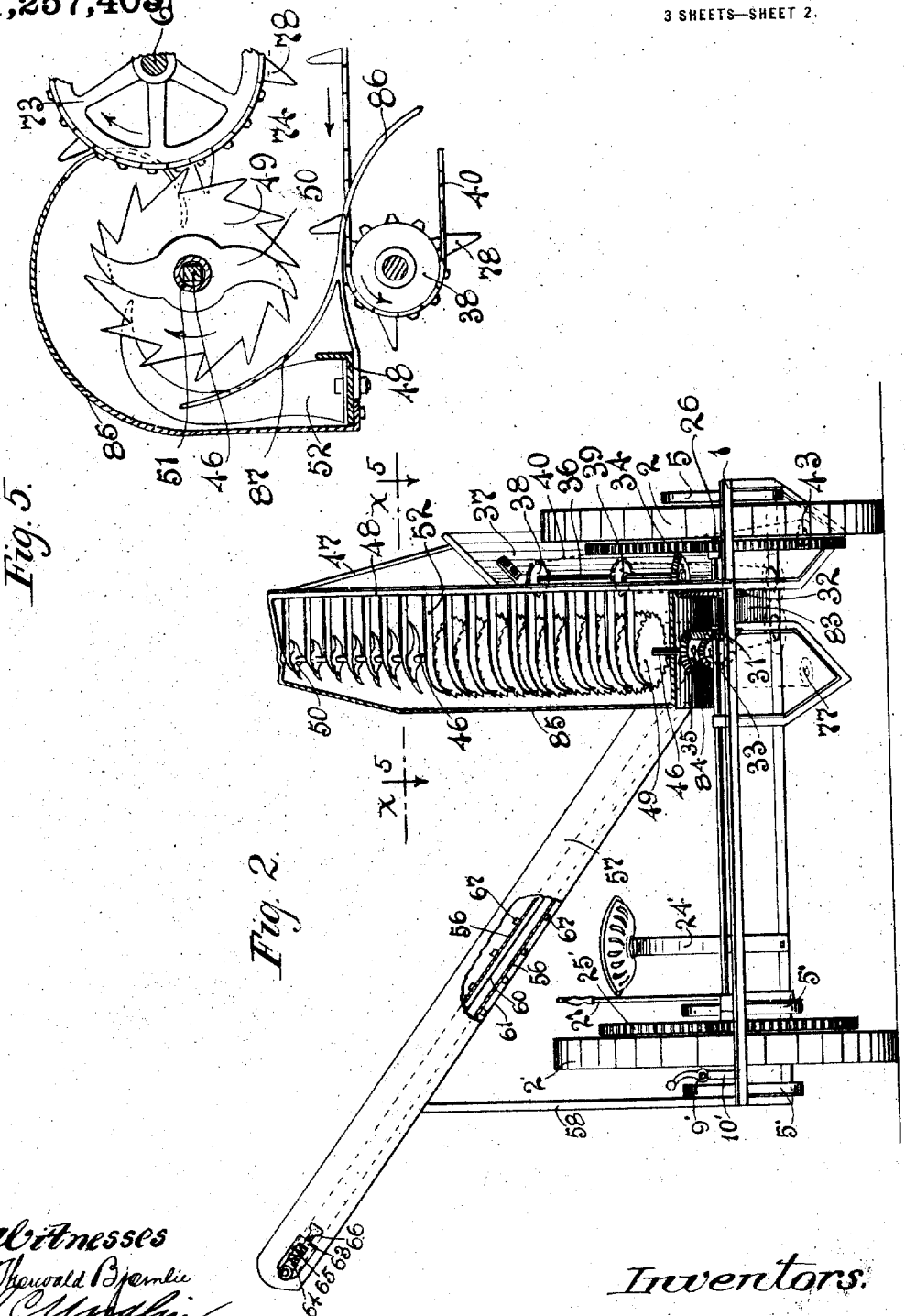

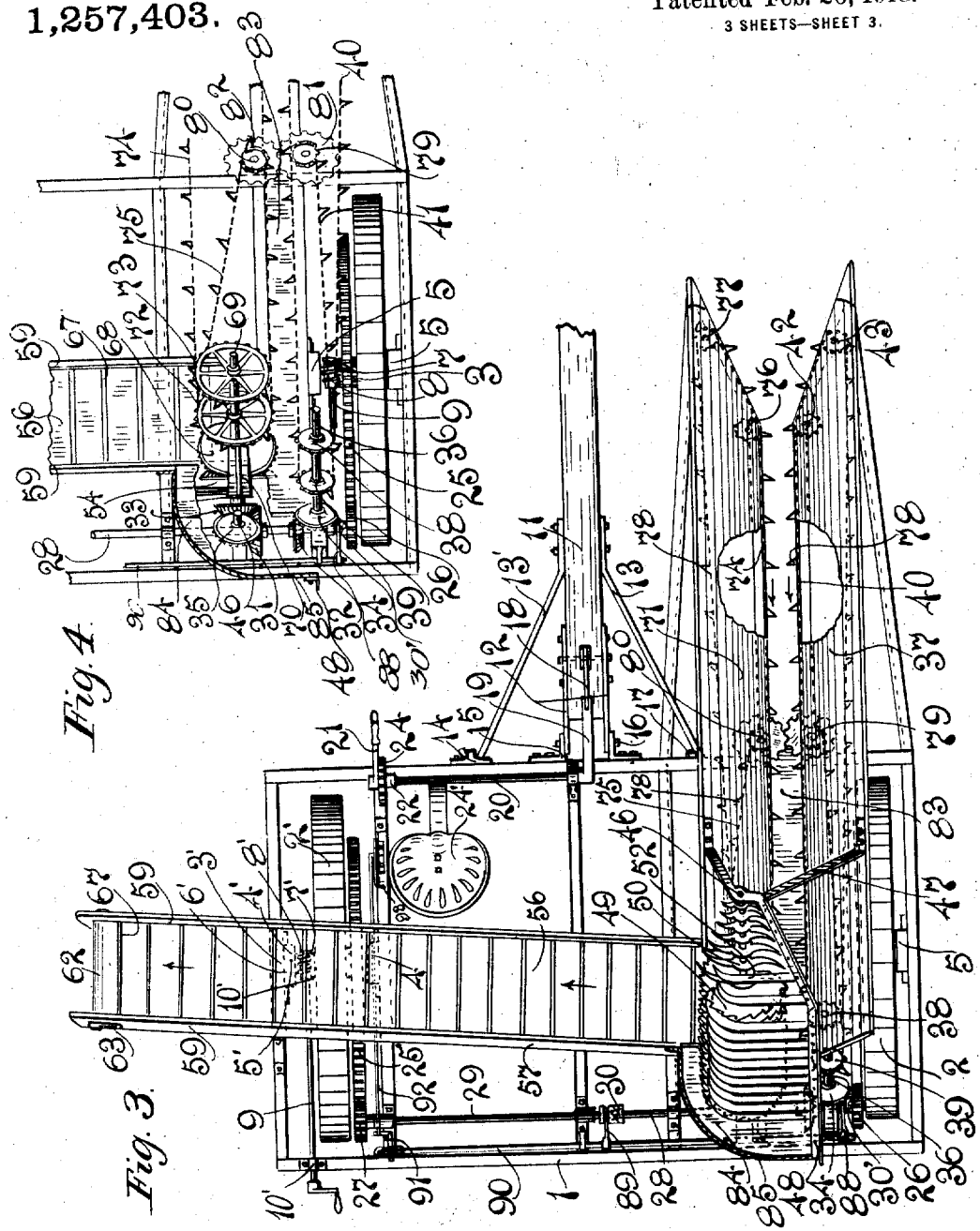

UNITED STATES PATENT OFFICE.

ANDREAN G. RONNING AND ADOLPH RONNING, OF BOYD, MINNESOTA.

ENSILAGE-HARVESTER.

1,257,403.    Specification of Letters Patent.    Patented Feb. 26, 1918.

Application filed February 25, 1914. Serial No. 820,970.

*To all whom it may concern:*

Be it known that we, ANDREAN G. RONNING, a citizen of the United States, residing at Boyd, in the county of Lac qui Parle and State of Minnesota, and ADOLPH RONNING, citizen of the United States, residing at Boyd, in the county of Lac qui Parle and State of Minnesota, have invented a new and Improved Ensilage-Harvester, of which the following is a specification.

Our invention, has for its object to provide a simple, compact and highly efficient ensilage harvester, that will cut the corn stalks or the like off the field, chop said stalk into small particles, and elevate and deliver said particles of stalk into the box of a wagon drawn alongside of said harvester, thus saving a great deal of expense and human labor in filling silos.

In the accompanying drawings, which illustrate the invention, like characters indicate like parts throughout the several views.

Referring to the drawings:

Figure 1. is a side elevation of the improved machine, some parts broken away;

Fig. 2. is a rear elevation of the machine, with some parts broken away;

Fig. 3. is a plan view of the machine, some parts broken away;

Fig. 4. is a fragmentary view taken from the same point of view as Fig. 3, but showing more in detail some of the mechanism not fully exhibited in Fig. 3;

Fig. 5. is a fragmentary view taken in section approximately on a line $X^5$ $X^5$, on Fig. 2.

The general construction of the machine will now be described.

The main frame 1 of the machine is carried by and nearly balanced on the bull wheels 2 and 2' and is so connected to the said wheels by means providing for vertical adjustment of the said main frame 1. The right hand wheel 2 is journaled on a short axle 3, which at its ends, has small spur gears 4, that work in guide brackets 5, which are secured on main frame 1, and provided with rack teeth 6 with which the said gears 4 are engaged. The axle 3 is provided at one end, with the worm gear 7, that is engaged by another worm gear 8, which is carried by the inner end of a crank shaft 9. Crank shaft 9 is provided at each end with suitable bearings 10 and thereby secured to main frame 1, and held in proper relation to the said worm gear 7, on axle 3. The left hand wheel 2' is journaled and secured to the main frame 1 in the same manner as the right hand bull wheel 2 already described, and figures prime from 2 to 10 inclusive indicate their similar and corresponding parts. The means have now been described whereby the main frame may be bodily adjusted vertically.

The machine is provided with a tongue 11 and is connected to the main frame with freedom for vertical pivotal adjustments and, as shown, this is accomplished by providing the said tongue with rearwardly projecting metallic straps 12 and brace rods 13, and 13', the rear ends of which are pivotally connected to the said main frame, respectively at points 14, 15, 16 and 17. Link 18 connects the intermediate portion of the tongue 11 to the forwardly projecting arm 19 of shaft 20, of latch lever 21. Said shaft is journaled in suitable bearings 22. Said latch lever 21 is secured to shaft 20 and provided with the usual latch piece 23, that is engageable with the notches of the latch segment or quadrant 24, to secure the lever in any set adjustment. By oscillatory movements of the lever 21, the front portion of the main frame, and the rear portion of the tongue may be raised and lowered with a sort of toggle action, thus affording a means for tilting the machine.

As to means for pulling the machine forward any well known tractor hitch or evener and whiffle-tree device may be attached to the tongue at any suitable and convenient place, and thus pulled forward by means of a traction engine or by means of draft animals.

A driver's seat 24' is attached to the main frame 1 near the front left-hand corner of said main frame.

Bull wheels 2 and 2' carry spur gears 25 and 25' which mesh with spur gears 26 and 27, which are carried by the ends of shafts 28 and 29 respectively. Shafts 28 and 29 are journaled, at their ends, in suitable bearings which are secured to main frame 1, and are so alined that they are connected and dis-connected by a jump and catch clutch 30, as illustrated in Fig. 3. The rigidly secured portion of clutch 30, is secured to the end of shaft 28, and a slidable portion of clutch 30 is loosely journaled on the end of shaft 29, said clutch end of shaft 29 being preferably square. Spur gear 26 carries on its inner side jump and catch teeth which mesh with the similarly constructed jump and catch teeth of the slidable clutch hub 30' which is journaled on an intermediate square portion of shaft 28, see Fig. 3, adjacent to spur gear 26, which is loosely journaled on the cylindered portion of shaft 28. Thus spur gear 26 will rotate shaft 28 only when its said jump and catch clutch teeth mesh with the similarly constructed jump and catch clutch teeth of said clutch hub 30'.

Parallel to shafts 28 and 29 is a shaft 90 which is journaled in suitable bearings which are secured to main frame 1. At its right end, as illustrated in Fig. 3, shaft 90 carries a spring finger 88. Spring finger 88, being secured to shaft 90 with one end, is loosely journaled, in well known fashion, to the slidable clutch hub 30'. Similarly spring finger 89 is secured to said shaft 90 with its one end, and is journaled to the slidable portion of the clutch hub 30, with its other end, in a well known and approved way. A lever 91 is made of two pieces, one arm of which is perpendicular or at right angles to the other. Said lever 91 is pivoted or journaled on a suitable bearing at a point where the said arms intersect. Said bearing of said lever 91 is secured, by a bolt or otherwise, to main frame 1. The rearward projecting arm of the said lever 91 is pivotally connected to the left end of said shaft 90 in such a way as to be able to slide said shaft 90 back and forth. The other end of the outwardly projecting arm of said lever 91 is pivotally connected with the rear end of a guide rod 92, which is pivotally connected to the lever handle of a lever attachment 93.
Said lever attachment 93 is of well known construction, with the usual lever, quadrant and means for securing said lever in any set position. Thus moving guide rod 92 back and forth by means of said lever mechanism 93, said lever 91 will slide shaft 90 back and forth, thus sliding the hubs of clutches 30 and 30' on their respective shafts in such a way as to put the machine in and out of gear. Furthermore as arms 88 and 89 are of spring steel, they will afford their respective clutch hubs a chance to slide back, if need be, and thus afford the possibility of turning the machine easily, when it is in gear.
Shaft 28 carries bevel gears 31 and 32 which mesh with bevel gears 33, 34 and 35. Bevel gear 34 is secured to the lower end of shaft 36 which runs transversly to shaft 28. Shaft 36 is journaled in suitable bearings at its upper and lower ends, said lower end bearing being secured to main frame 1, and said upper bearing being secured to gathering board 37. Said shaft 36 also carries sprocket 38 over which runs the gathering chain 40 and sprocket 39 over which runs the gathering chain 41. Idlers 42 and 43 are provided with suitable bearings and means for adjustment 44 and 45 which are of well known construction and which are secured to main frame 1, and which are for the purpose of carrying and directing gathering chain 40. Bevel gear 35 is secured to shaft 46. Shaft 46 is journaled in suitable bearings at each end, said lower end bearing being secured to main frame 1 and the said upper end bearing being secured to angle irons 47 and 48. Shaft 46 between said bearings is preferably square and carries a series of chopping disks 49 and cutter blades 50, and also a series of thimbles or sleeves 51, which are for the purpose of reinforcing shaft 46 and for the purpose of holding said cutter blades and chopping disks parallel to each other and at a proper distance apart. Chopping disks 49 are thin, flat circular pieces of steel with square holes in their centers to fit closely the form of shaft 46 and carry at their circumferences ground and sharpened finger blades or cut outs as best illustrated in Fig. 5. It will be understood that these cut outs may be semicircular, V shaped as illustrated or cut in any such convenient manner. Cutter blades 50 are also thin flat pieces of steel made to fit shaft 46, but instead of being circular as chopping disks 49 are, they are smaller chopping disks with preferably two relatively large hooked cutter blades.

Angle iron 48 is fastened and braced to the main frame 1, and carries a series of knives 52, which are preferably curved, as illustrated in Fig. 5. These cradle knives may be secured to angle iron 48 by any of the well known means of adjustment, and are sharpened and made to shear up against the under side of chopping disks 49 and cutter blades 50.

Bevel gear 33 is secured to shaft 53. Shaft 53 is journaled in suitable bearings, at each end, which are secured to the main frame 1, and besides carrying bevel gear 33 at its rear end it also carries bevel gear 54 and roller 55. Roller 55 carries an endless belt 56 which forms part of a conveying mechanism and elevator 57. Elevator 57 is secured, at its lower end to main frame 1, and the upper portion is secured and braced to the main frame by means of support 58. Said elevator consists of two pieces of board or sheet metal 59, guide straps 60 and 61, suitable braces, roller 55, conveyer belt 56 and upper roller 62, which is journaled, at each end, in suitable bearings to the guide boards 59. Such suitable bearings may consist of yoke 63, which is secured to guide boards 59, slot 64 which carries the ends of roller 62, coil spring 65, set screw and adjusting device 66, as illustrated in Fig. 1 and in Fig. 2. Endless conveyer belt 56 carries slats 67, and moves, when in operation, transversely to the movement of the machine, and revolves in the direction as indicated by arrows which are shown in Fig. 3.

Bevel gear 54 meshes with bevel gear 68 which is carried by the lower end of a transverse counter shaft 69. Shaft 69 is journaled, at its lower end, in suitable bearings which are carried by bearing supports 70 and secured to main frame 1. At its upper end shaft 69 is journaled in suitable bearings which are secured to the uppermost end of guide board 71. Between the said bearings said shaft 69 carries sprocket 72 over which runs the endless gathering chain 75, and sprocket 73 over which runs the endless gathering chain 74. Gathering chain 74 runs, at its lower loop, over idlers 76 and 77. Idlers 76 and 77 are journaled on suitable bearings and bearing supports, and said bearing supports are secured to main frame 1 in the same manner as idlers 42 and 43 and bearing supports 44 and 45, as illustrated in Fig. 1. Endless gathering chains 40, 41, 74 and 75 carry fingers 78, which are of well known and approved construction.

Gathering boards 37 and 71 incline forward and their inner edges diverge so as to guide the standing stalks into the channel left between them. At their lower and front ends they are attached to the projecting angle irons of main frame 1 thus forming an acute angle with the said projecting portion of the main frame.

Gathering chains 41 and 75 run over sprockets 39 and 72 respectively. Endless gathering chain 41 runs at its lower loop over idler 79, and endless gathering chain 75 runs at its lower loop over idler 80. Idlers 79 and 80 carry, on their under sides, thin circular pieces of steel 81 and 82. Said pieces of steel 81 and 82 have indentations or cut outs at their circumferences and are sharpened and adjusted to form shearing sickle cutters, as best illustrated in Fig. 4. Being considerably larger than idler sprockets 79 and 80, said cut out circular sickle cutters 81 and 82 overlap their cutting edges at points midway between their centers, in such a way as to shear one against the other, thus affording the ensilage harvester two cooperating sickle cutters or means by which to cut the standing stalks off the ground. Said idler sprocket 79 being secured to disk sickle 81 and said idler sprocket 80 being secured to disk sickle 82 are each respectively mounted on suitable bearings and bearing supports, and said bearing supports are secured and adjusted to main frame 1, in any well known manner.

From the rear of said disk sickles extends a U shaped chute 83 which extends rearward and inclines upward until it reaches the lower disk cutters 49, from which point a chute board 84 continues to extend rearwardly and upwardly until it reaches angle iron 48, thus said chute board 84 forms a forward inclined chute part of which is arranged to receive from chute 83 and part to deliver to the canvas of elevator 57. Onto the rear end of said chute board 84 is fastened, by means of screws or otherwise, the lower end of hopper 85. Hopper 85 is secured on one side to angle iron 48, by means of rivets, bolts or otherwise, and runs along the back of cradle knives 52, circles around disk cutters 49 and cutter blades 50, the receiving and under slung side of which coils back toward the center of shaft 46, as best illustrated in Fig. 5. The dotted portion of hopper 85, as indicated in Fig. 5, represents the under slung portion of the said hopper which has loop holes or slits cut in it to allow sprockets 72 and 73 and disk cutters 49 and cutter blades 50 to pass through it as they would through the teeth of a large comb. This is designed for the purpose of combing out the cut particles of stalk which may lodge between said disk cutters and cutter blades.

Spring fingers 86 are secured to angle iron 48, by bolts or otherwise. Spring fingers 87 are secured to spring fingers 86, by riveting them together or otherwise, as best illustrated in Fig. 5. The purpose of these spring fingers is to direct the stalks toward the disk cutters 49 and cutter blades 50.

Of course many things may be slightly changed and modified, as for an instance, the manner of mounting the chopping mechanism with its drive shaft 46, beveled gear 35, chopping disks 49, cutting blades 50, cooperating cradle blades 52, angle iron 48, attached hopper 85, etc., which may be mounted on the machine in different ways. Said cutting mechanism may be turned to the side in such a way as to be almost immediately above and parallel to elevator 57, which is all a matter of how much the beveled gears 35 and 31 are beveled and of how said chopping mechanism is adapted, braced and supported. Again, said chopping mechanism may be swung forward to one side or it may be swung backward, as for instance, into such a position as indicated by the dotted lines at the rear of the machine as shown in Fig. 1, which is simply a matter of how the said chopping mechanism is mounted and of how said chute board is constructed.

The movement and operation of the ensilage harvester will then be as follows. As the machine is drawn forwardly, ground stalks are directed between gathering boards 37 and 71 and drawn rearwardly by gathering chains 40 and 74 until they are engaged and sheared from the ground by means of colter sickles 81 and 82. The gathering chains 40, 74, 41 and 75 continue to move the stalks rearwardly and parallel to their initial positions with their butt ends riding upon the inclined U-shaped chute 83 until they are directed by spring fingers 86 and 87 on to direct engagement with colter cutters 49 and cutter blades 50, which, turning in the direction as indicated by the arrows in Fig. 5, continue to move the stalks parallel to their initial position, but in doing so the stalks soon come in contact with cradle knives 52 and are gradually sheared and cut into small particles by the draw knife shearing of the cradle knives on the side and the shearing of the colter cutters and cutter blades on the other. By this sort of operation, there will be no power lost by sudden jarring, as the cutting is of a comparatively gradual nature, and what is more, there will be no power wasted on the feeding rollers as in the ordinary ensilage cutters, and there will be comparatively no power wasted by jamming the stalks against a cutting bar as is commonly done, for the stalk is cut on both sides at the same time, and before power is utilized by the revolving colter cutters 49 and cutter blades 50 to feed the stalks, is employed at the same time to cut the stalk into small particles. The cut particles of stalk then drop into hopper 85 and directed by chute board 84 on to the endless conveyer belt 56 of elevator 57 and carried transversely to the movement of the machine into the box of a wagon drawn alongside of the machine.

We have now briefly described the parts, movements, and functions of the ensilage harvester when made according to our preferred design. But, of course, many things may be slightly changed, as for instance, the manner of mounting of the mechanism, with its drive shaft 46, beveled gear 35, colter cutters 41, hooked knife blades 50, cradle blades 52, angle iron 48 and hopper 85, etc., which may be mounted on the machine in different ways. Said cutting mechanism may be turned to the side in such a way as to be almost immediately above and parallel to elevator 57, which is all a matter of how much the bevel wheels 35 and 31 are beveled and of how said cutting mechanism is braced and supported. Or again, said cutting mechanism may be swung back, as for instance, into such a position as indicated by the dotted lines at the rear of the machine, as shown in Fig. 1, which is simply a matter of how the cutting mechanism is mounted and of how the chute board is constructed.

In reduction to practice, we have found that the form of my invention illustrated in the drawings and referred to in the above description as the preferred embodiment is the most efficient and practical, yet realizing that the conditions concurrent with the adoption of my device will necessarily vary, we desire to emphasize the fact that various minor changes in details of construction, proportion and arrangement of parts may be resorted to, when required, without sacrificing any of the advantages of my invention as defined in the appended claims.

Having thus described our invention, what we claim as new and desire to secure by Letters Patent is—

1. In an ensilage harvester, cutting means for severing the standing stalks, guiding and conveying means for conveying the severed stalks rearwardly from the cutting means, a substantially vertically positioned series of cutters for cutting the severed stalks into short lengths and mechanism for operating the cutting and conveying means.

2. In an ensilage harvester, cutting means for severing the standing stalks, guiding and conveying means for conveying the severed stalks rearwardly from the cutting means, a substantially vertically positioned series of cutters for cutting the severed stalks into short lengths, mechanism for operating the cutting and conveying means and a conveyer for receiving the ensilage and transferring it to a receptacle and means for operating the conveyer.

3. In a harvester, cutters for severing the standing stalks, guiding and conveying means for conveying the severed stalks rearwardly from the cutting means, a rotatable shaft carrying a series of cutters, said shaft capable of adjustment into various positions in a substantially vertical plane, and a frame carrying a series of stationary cutters coöperating with said movable cutters to reduce the severed stalks into short lengths.

4. In an ensilage harvester, a transverse power shaft, means for driving said shaft, cutting means for severing the standing stalks, guiding and conveying means for moving the severed stalks rearwardly from said cutting means, means for operating the cutting and conveying means from said shaft and a second shaft carrying a series of cutters mounted in a frame provided with a series of stationary cutters coöperating with said first-named series of cutters, said second named shaft being at right angles to and movable about said first-named shaft as a pivot and means for operating said second-named shaft from said first-named shaft.

ANDREAN G. RONNING.
ADOLPH RONNING.

Witnesses:
THORWALD BJORNLIE,
I. C. UNDLIN.